Jan. 2, 1940. J. BRUNSWICK 2,185,398
MULTICELLULAR RUBBER TIRE
Filed March 12, 1936

Inventor
Jules Brunswick
By Davis Marvin Edmonds
Attorneys

Patented Jan. 2, 1940

2,185,398

UNITED STATES PATENT OFFICE 2,185,398

MULTICELLULAR RUBBER TIRE

Jules Brunswick, Paris, France, assignor to Maurice Baudou, Rene Baudou, both of Les Eglisottes (Gironde), France, and himself Application March 12, 1936, Serial No. 68,470
In France October 10, 1935

5 Claims. (Cl. 152—153)

The present invention concerns cellular rubber tires of the type including inner partitions a part of which are disposed longitudinally while the others are disposed transversely, the whole being moulded in a single piece together with the envelope.

These partitions, which are substantially at right angles to the tread of the tire, are in compression under the effect of the loads supported by said tire when the latter is running, which loads are transmitted to said tire by the rim of the wheel and must act on the tread of the tire. These are the conditions under which rubber is to be placed so that said rubber is compressed and not subjected to tractive stresses.

The essential feature of the present invention consists, in accordance with these conditions, in prolonging as much as possible said partitions toward the rim, leaving, along the rim, but a small longitudinal conduit the section of which is just sufficient for the flow of air serving to cool the tire. Owing to these relative dimensions, this conduit is of little consequence from the point of view of the transmission of the loads and its presence does not interfere with the proper utilization of the elasticity of rubber.

In known tires, the cells or recesses are obtained, when moulding the tire, by means of a core of special shape, which determines the dimensions of the cells or recesses and of the partitions. This core is made of distinct elements, connected together so as to form the circular piece which is disposed inside the elements of the mould. Said core necessarily includes a part located on the outside of the mould, so as to leave an opening which permits, when unmoulding, of extracting each of the elements of the core. To this part corresponds the longitudinal conduit or recess of the tire. The presence of this recess has for its consequence that the loads are transmitted between the tire and the rim only through the beads provided at the ends of the lateral walls of the tire, that is to say under bad conditions, which may be improved only by filling said conduit by means of blocks or masses inserted in the moulded tire.

According to the present invention, the longitudinal conduit is reduced as much as possible by providing the core in such manner as to obtain transverse partitions which extend nearly to the rim but having at least one slit, which permits of moving the beads to move away from each other so as to extract the core elements when the tire is moulded. With such an arrangement the two edges of the slit can be in contact and they may be glued together through vulcanizing of the rubber, which permits of obtaining uninterrupted transverse partitions extending to the base of the tire.

According to another embodiment of the invention, the same result can be obtained with a different mould the core of which (consisting of pins or studs of suitable shape attached to a circular ring) forms in the tire cells or recesses substantially at right angle to the tread. The partitions existing between these recesses, substantially at right angles to the tread and which extend as far as the base, are equivalent to those of the preceding embodiment, with cross sections which may vary considerably as to their shapes and arrangements.

Other features of the present invention will result from the following detailed description of some specific embodiments thereof.

Preferred embodiments of the present invention will be hereinafter described, with reference to the accompanying drawing, given merely by way of example, and in which.

Figure 1:
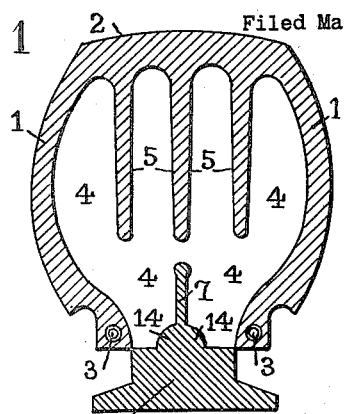
Fig. 1 is a transverse section of a first embodiment of a tire according to the invention; the core serving to the moulding operation being also visible on this figure.
Figure 2:
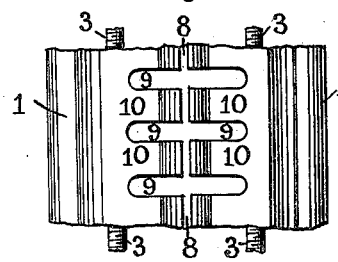
Fig. 2 is a bottom view of this tire when it leaves the mould.

In the embodiment of Figs. 1 and 2, reference character 1 designates the outer envelope of the tire, 2 is the tread, and 3 are the elastic reinforcements which keep the beads in the rim of the wheel. The section of Fig. 1 is made close to a transverse partition and through a cell or recess; 4 is the portion of the core of the mould which forms this cell or recess. The longitudinal partitions are visible in section at 5. The annular part of the core is shown at 6.

This annular part 6 is provided with a continuous annular rib 7, so as to form a corresponding slit in the transverse partitions. This slit permits the two bead portions of the tire to move away from each other when the tire is removed from the mould, whereby it is possible to extract, one after another, the portions of the core that have served to form the cells.

The tire, once removed from the mould, seen from the side of the rim, has the appearance of Fig. 2, in which 8 is the cap provided by rib 7, 9 are the cells and 10 are the bases of the transverse partitions.

Figure 3:
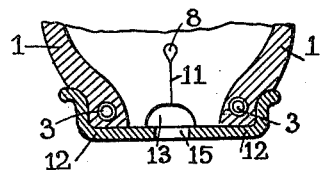
Fig. 3 is a practical transverse section of the tire, when finished and fitted on its rim.

It is then possible to bring together the lips of gap 8, and to glue them together by vulcanizing rubber, as shown at 11 in Fig. 3, the tire thus treated being fitted on its rim 12. The transverse partitions thus obtained extend as far as the rim and bear thereon as much as it is desired. However, I provide a small aeration conduit 13, owing to annular projections 14 of the core. This conduit 13, which connects together the various cells and which communicates with holes 15 suitably distributed over the whole periphery of the rim permits a certain circulation of air which serves to cool the tire when the latter is running on the road surface.

Figure 4:
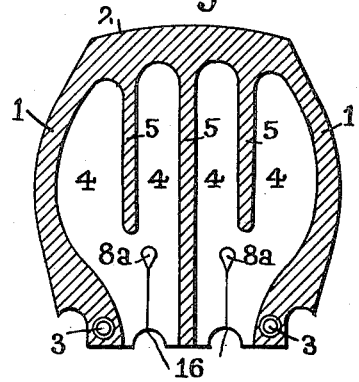
Fig. 4 is a transverse section of a slightly different embodiment of the tire according to the present invention.

The embodiment of Fig. 4 differs from that above described only in that it includes two slits 8a, instead of a single one. This makes it possible to prolong the middle longitudinal partition as far as the rim, each of the halves of the tire being opened along said slit so as to remove the corresponding portion of the core. We may then provide two air conduits 16.

Figure 5:
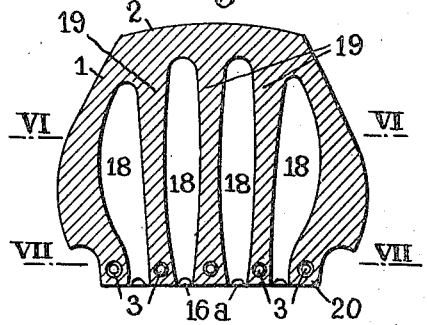
Fig. 5 is a transverse section of a modification of the invention.
Figure 6:
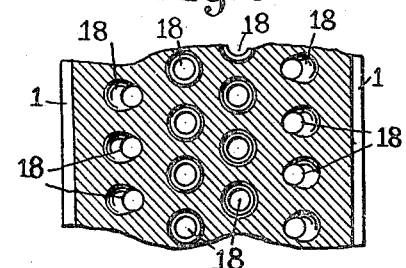
Fig. 6 is a sectional view on the line VI—VI of Fig. 5.
Figure 7:
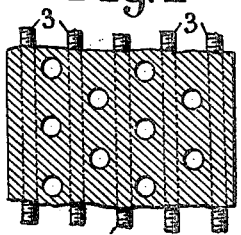
Fig. 7 is a sectional view on the line VII—VII of Fig. 5.

Figs. 5, 6 and 7 relate to another embodiment of the invention.

In Fig. 5, reference character 1 is the outer envelope, 2 is the tread, and 3 are the elastic reinforcements serving to maintain the tire on the rim. The rubber mass of the tire is provided with recesses 18, substantially at right angles to tread 2, having cross sections which, in this case, are not necessarily rectangular, as in the preceding embodiment, and may be substantially circular (Fig. 6). Besides the area of the cross section of each of these recesses may vary along their height, so as to provide regions of greater flexibility either close to the tread or close to the rim. Between these cells 18, the partitions 19 are of somewhat complex shape. It will be noted, on Figs. 6 and 7, that cells 18 may be disposed in any way, provided that one provides, in the base, and in the longitudinal direction, rectilinear bands of rubber 20, for the housing of elastic reinforcements 3. We may, of course, provide, in the base, air conduits 16a.

The cells thus made are obtained, when moulding the tire, by means of cores of corresponding shape, fixed in the mould. Between these cells are provided the rubber partitions 19, which are therefore substantially at right angles to tread 2, and which are in compression under the effect of the loads.

Figure 8:
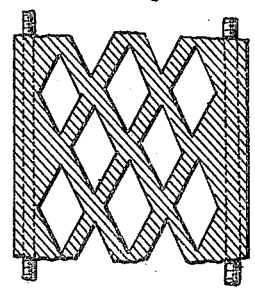
Fig. 8 shows still another embodiment, this view being analogous to Fig. 6.

According to the specific cases, the different cells might have, one with respect to another, very different arrangements. For instance, the section of the tire parallel to the tread might have the appearance of Fig. 8. In this case, the cells leave between them partitions of substantially uniform thickness.

With this kind of tire, the relative importance of the solid and recessed parts can be easily varied, which permits of providing a flexibility in accordance with the load in each specific case, and also in each portion of the tire. We may, for instance, increase the strength of the tire, at the base, according to the case.

While we have, in the above description, disclosed what we deem to be practical and efficient embodiments of the present invention, it should be well understood that we do not wish to be limited thereto as there might be changes made in the arrangement, disposition and form of the parts without departing from the principle of the present invention as comprehended within the scope of the appended claims.

What I claim is:

1. In combination a wheel rim having aeration holes formed therein and having a tire-base-engaging portion, a cellular rubber tire comprising an external envelope, a tread on said envelope and a base for connection with said wheel rim, said tire being provided with a plurality of recesses extending transversely to said tread and open at the base of said tire, partitions between said recesses extending at right angles to said tread as far as said base moulded integrally with said envelope, said tire being further provided with a longitudinal channel along its base in communication with said aeration holes of the rim, for cooling the rubber of the tire by circulation of air fed to said channel through said holes.

2. A cellular rubber tire which comprises an external envelope, a tread on said envelope and a base for connection with a wheel rim having aeration holes formed therein, said tire being provided with a plurality of recesses extending transversely to said tread and open at the base of said tire, partitions between said recesses extending transversely to the circumference of said tire and at right angles to said tread from said tread to said base, other partitions running longitudinally to the circumference of said tire from said tread to a distance from said base, said tire being further provided with at least one longitudinal channel along its base in communication with said aeration holes of the rim, for cooling the rubber of the tire by circulation of air fed to said channel through said holes.

3. A cellular rubber tire which comprises, an external envelope, a tread on said envelope and a base adapted to fit on a wheel rim having aeration holes formed therein, said tire being provided with a plurality of recesses extending at right angles to said tread and open at the base of said tire, transverse partitions between said recesses extending at right angles to the plane of the circumference of said tire, in radial planes, moulded integral with said envelope from one side thereof to the opposite side, longitudinal partitions running parallel to the plane of the circumference of said tire, said tire being further provided with at least one longitudinal channel extending along its base through said transverse partitions, in communication with said aeration holes of said rim for cooling the rubber of the tire by circulation of air fed to said channel through said holes of the rim.

4. A cellular rubber tire which comprises, an external envelope, a tread on said envelope and a base adapted to fit on a wheel rim having aeration holes formed therein, said tire being provided with a plurality of recesses extending at right angles to said tread and open at the base of said tire, transverse partitions between said recesses extending at right angles to the plane of the circumference of said tire, in radial planes, moulded integral with said envelope from one side thereof to the opposite side, longitudinal partitions also moulded integral with said envelope running parallel to the plane of the circumference of said tire, one of said longitudinal partitions, located in the median plane of said tire, extending from said tread to said base, the others extending merely from said tread to a distance from said base, said tire being further provided with one longitudinal conduit on each side of said median longitudinal partition extending along said base through said transverse partitions, in communication with said aeration holes of said rim, for cooling the rubber of the tire by circulation of air fed to said channels through said holes.

5. In combination a wheel rim having aeration holes formed therein and having a tire-base-engaging portion, a cellular rubber tire comprising an external envelope, a tread on said envelope and a base for connection with wheel rim, said tire being provided with radial recesses open at the base, partitions between said recesses extending to the circumference of said tire so as to bear on said wheel rim and moulded integral with said envelope, circumferential elastic reinforcing means running in the base parts of said partitions and embedded therein, said tire being further provided with at least one longitudinal channel along its base in communication with said aeration holes of the rim, for cooling the rubber of the tire by circulation of air fed to said channel through said holes.

JULES BRUNSWICK.